C. H. LEE.
Churn.
No. 70,725.
Patented Nov. 12, 1867.
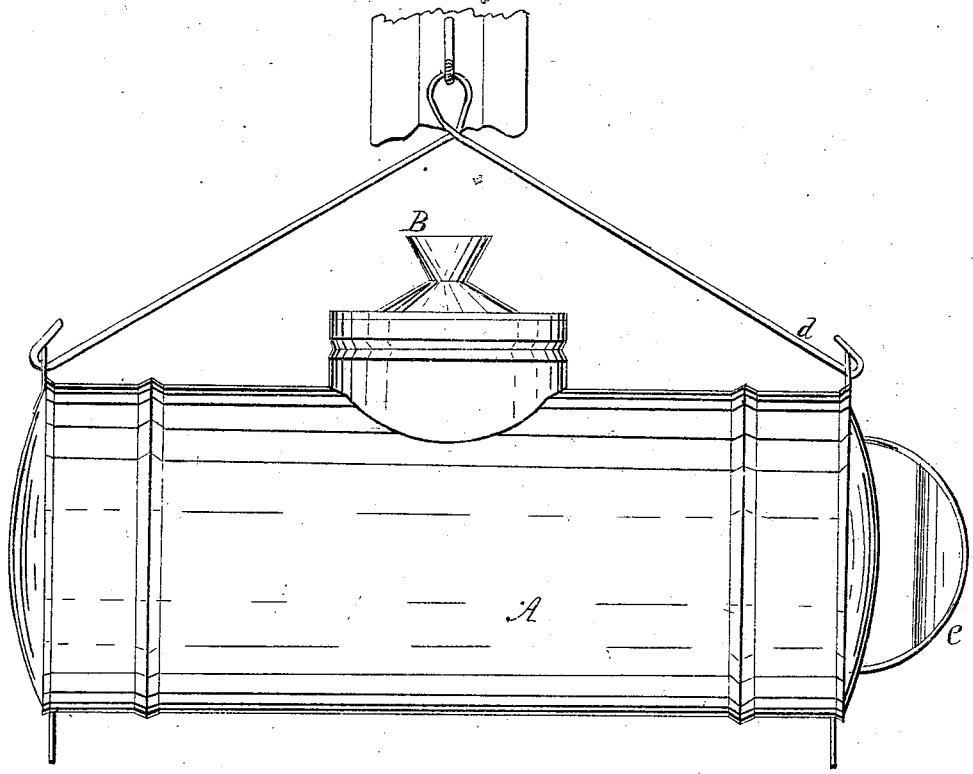
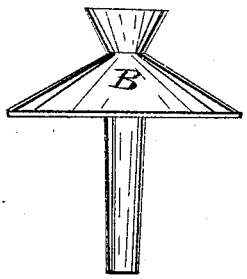
Witnesses:
Jno. A. Ellis
Jos. White
Inventor
Per
T. H. Alexander & Co
Attys.

United States Patent Office.

C. H. LEE, OF OSKALOOSA, IOWA.

Letters Patent No. 70,725, dated November 12, 1867.

IMPROVEMENT IN CHURNS.

*The Schedule referred to in these Letters Patent and making part of the same.*

TO ALL WHOM IT MAY CONCERN:

Be it known that I, C. H. LEE, of Oskaloosa, in the county of Mahaska, and State of Iowa, have invented certain new and useful Improvements in Churns; and I do hereby declare that the following is a full, clear, and exact description thereof, reference being had to the accompanying drawings, and to the letters of reference marked thereon, which form a part of this specification, in which—

Figure 1 is a side view, and
Figure 2 a view of the mouth-piece.

The nature of this invention consists in the employment of cylindrical-shaped vessel or churn, constructed as hereinafter described, in combination with the peculiarly-constructed mouth-piece.

To enable others skilled in the art to make and use my invention, I will describe it.

A represents a cylindrical-shaped vessel, provided with a circular opening for its mouth. $d$ is a metal loop or handle, fastened to ears at each end of the churn. $e$ represents a fixed or rigid handle, permanently secured at one end of the churn. B is the mouth-piece, which consists of a tube with a funnel-shaped top or entrance. This tube is provided with an inverted funnel-shaped collar, which fits tightly in the mouth of the churn.

The operation of my invention is as follows: I suspend the churn, as seen in fig. 1, and by means of the handle $e$ the milk is agitated until butter is produced.

What I claim, and desire to secure by Letters Patent, is—

The churn A, provided with a turret, in combination with a mouth-piece, B, so constructed as to admit a free circulation of air in the churn, and at the same time prevent the cream from escaping, substantially as herein set forth and described.

In testimony that I claim the foregoing as my own, I affix my signature in presence of two witnesses.

C. H. LEE.

Witnesses:
 JOHN F. LACEY,
 W. E. SHEPHERD.